United States Patent
Vanska et al.

(10) Patent No.: US 9,158,332 B2
(45) Date of Patent: Oct. 13, 2015

(54) LIMITING MOVEMENT

(71) Applicant: Nokia Corporation, Espoo (FI)

(72) Inventors: Anssi Ilmari Vanska, Helsinki (FI);
Matti Kosonen, Jarvenpaa (FI); Antti Oskari Salo, Lohja (FI); Sami Myyrylainen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 65 days.

(21) Appl. No.: 13/657,203

(22) Filed: Oct. 22, 2012

(65) Prior Publication Data
US 2014/0112704 A1   Apr. 24, 2014

(51) Int. Cl.
G05F 1/16      (2006.01)
G06F 1/16      (2006.01)
G06F 1/18      (2006.01)

(52) U.S. Cl.
CPC ...... *G06F 1/16* (2013.01); *G06F 1/181* (2013.01); *Y10T 403/32549* (2015.01)

(58) Field of Classification Search
CPC ..... G06F 1/1681; G06F 1/1652; G06F 1/163; G06F 1/1641; F16M 11/2028; F16M 11/2021; F16C 11/04; H05K 7/16; A41D 19/01588; A41D 13/0153; A44C 5/102
USPC ............ 403/62, 112, 113, 117, 56; 89/36.05, 89/913, 917; 2/2.5; 361/679.03, 749; 345/156
See application file for complete search history.

(56) References Cited

U.S. PATENT DOCUMENTS 1,410,366 A *  3/1922 Buchman ....................... 59/80
3,880,500 A    4/1975 Kojabashian ................. 359/847
4,483,020 A * 11/1984 Dunn ............................. 2/2.5
5,007,108 A *  4/1991 Laberge et al. .................. 2/463
5,214,623 A *  5/1993 Seager ......................... 368/10
5,588,167 A   12/1996 Pahno et al. .................. 5/606
5,706,026 A    1/1998 Kent et al. .................. 345/156
5,771,489 A *  6/1998 Snedeker ...................... 2/2.5
5,795,430 A    8/1998 Beeteson et al. ............ 156/350

(Continued)

FOREIGN PATENT DOCUMENTS

CN      1598870 A       3/2005
CN      1617614 A       5/2005

(Continued)

OTHER PUBLICATIONS

Mina; *Samsung Unveils Flexible Android Smartphone*; http://www.androidauthority.com/samsung-unveils-flexible-android-smartphone-24933/ (8 pages).

(Continued)

*Primary Examiner* — Joshua Kennedy
(74) *Attorney, Agent, or Firm* — Harrington & Smith

(57) ABSTRACT

An apparatus including a first portion comprising a projection extending in a first direction; a second portion comprising an aperture extending in the first direction, where the first portion and the second portion are configured for relative movement in at least the first direction; and wherein the projection extends from the first portion in the first direction between the first portion and the second portion through the aperture and wherein the aperture surrounds the projection with clearances configured to enforce limits on relative movement of the first portion and the second portion while enabling reciprocating movement of the first portion and the second portion in the first direction towards each other and away from each other.

5 Claims, 6 Drawing Sheets

(56) References Cited

U.S. PATENT DOCUMENTS

| | | | | |
|---|---|---|---|---|
| 5,923,318 | A | 7/1999 | Zhai et al. | 345/157 |
| 6,160,540 | A | 12/2000 | Fishkin et al. | 345/184 |
| 6,441,809 | B2 | 8/2002 | Kent et al. | 345/177 |
| 6,556,189 | B1 | 4/2003 | Takahata et al. | 345/173 |
| 6,557,177 | B2 * | 5/2003 | Hochmuth | 2/159 |
| 7,075,527 | B2 | 7/2006 | Takagi et al. | 345/184 |
| 7,443,380 | B2 | 10/2008 | Nozawa | 345/156 |
| 7,456,823 | B2 | 11/2008 | Poupyrev et al. | 345/173 |
| 8,194,399 | B2 | 6/2012 | Ashcraft et al. | 361/679.05 |
| 8,380,327 | B2 | 2/2013 | Park | 700/1 |
| 8,619,021 | B2 | 12/2013 | Hayton | 345/107 |
| 8,780,540 | B2 | 7/2014 | Whit et al. | 361/679.09 |
| 8,780,541 | B2 | 7/2014 | Whit et al. | 361/679.09 |
| 2001/0033275 | A1 | 10/2001 | Kent et al. | 345/173 |
| 2002/0033798 | A1 | 3/2002 | Nakamura et al. | 345/156 |
| 2002/0167495 | A1 | 11/2002 | Quinn et al. | 345/173 |
| 2003/0144034 | A1 | 7/2003 | Hack et al. | 455/566 |
| 2003/0147205 | A1 | 8/2003 | Murphy | 361/680 |
| 2003/0210801 | A1 | 11/2003 | Naksen et al. | |
| 2003/0214485 | A1 | 11/2003 | Roberts | 345/173 |
| 2003/0227441 | A1 | 12/2003 | Hioki et al. | 345/156 |
| 2004/0008191 | A1 | 1/2004 | Poupyrev et al. | 345/156 |
| 2004/0017355 | A1 | 1/2004 | Shim | 345/157 |
| 2004/0035994 | A1 | 2/2004 | Cho et al. | 248/276.1 |
| 2004/0046739 | A1 | 3/2004 | Gettemy | 345/158 |
| 2004/0239631 | A1 | 12/2004 | Gresham | |
| 2005/0051693 | A1 | 3/2005 | Chu | 248/371 |
| 2005/0057527 | A1 | 3/2005 | Takenaka et al. | 345/173 |
| 2005/0140646 | A1 | 6/2005 | Nozawa | 345/156 |
| 2005/0162389 | A1 | 7/2005 | Obermeyer et al. | 345/161 |
| 2005/0237308 | A1 | 10/2005 | Autio et al. | 345/173 |
| 2006/0007151 | A1 | 1/2006 | Ram | 345/163 |
| 2006/0077672 | A1 | 4/2006 | Schaak | |
| 2006/0199999 | A1 | 9/2006 | Ikeda et al. | |
| 2006/0238494 | A1 | 10/2006 | Narayanaswami et al. | 345/156 |
| 2007/0040810 | A1 | 2/2007 | Dowe et al. | 345/173 |
| 2007/0154254 | A1 * | 7/2007 | Bevirt | 403/56 |
| 2007/0205997 | A1 | 9/2007 | Lieshout et al. | 345/204 |
| 2008/0018631 | A1 * | 1/2008 | Hioki et al. | 345/206 |
| 2008/0042940 | A1 * | 2/2008 | Hasegawa | 345/76 |
| 2008/0251662 | A1 | 10/2008 | Desorbo et al. | |
| 2009/0058828 | A1 | 3/2009 | Jiang et al. | 345/173 |
| 2009/0088204 | A1 | 4/2009 | Culbert et al. | 455/556.1 |
| 2009/0115734 | A1 | 5/2009 | Fredriksson et al. | 345/173 |
| 2009/0184921 | A1 | 7/2009 | Scott et al. | 345/156 |
| 2009/0219247 | A1 | 9/2009 | Watanabe et al. | 345/157 |
| 2009/0237872 | A1 | 9/2009 | Bemelmans et al. | 361/679.01 |
| 2009/0244013 | A1 | 10/2009 | Eldershaw | 345/173 |
| 2009/0326833 | A1 | 12/2009 | Ryhanen et al. | 702/33 |
| 2010/0011291 | A1 | 1/2010 | Nurmi | 715/702 |
| 2010/0013939 | A1 | 1/2010 | Ohno et al. | 348/208.5 |
| 2010/0108828 | A1 | 5/2010 | Yu et al. | |
| 2010/0141605 | A1 | 6/2010 | Kang et al. | 345/174 |
| 2010/0164888 | A1 | 7/2010 | Okumura et al. | 345/173 |
| 2010/0228295 | A1 | 9/2010 | Whitefield | |
| 2010/0238612 | A1 | 9/2010 | Hsiao et al. | 361/679.01 |
| 2010/0263245 | A1 | 10/2010 | Bowser | 40/517 |
| 2011/0057873 | A1 | 3/2011 | Geissler et al. | 345/156 |
| 2011/0062703 | A1 | 3/2011 | Lopez et al. | 285/129.1 |
| 2011/0080155 | A1 | 4/2011 | Aldridge | 323/318 |
| 2011/0095999 | A1 | 4/2011 | Hayton | 345/173 |
| 2011/0167391 | A1 | 7/2011 | Momeyer et al. | 715/863 |
| 2011/0181494 | A1 | 7/2011 | Wong et al. | 345/1.3 |
| 2011/0193771 | A1 | 8/2011 | Chronqvist | 345/156 |
| 2011/0227822 | A1 * | 9/2011 | Shai | 345/156 |
| 2011/0241822 | A1 | 10/2011 | Opran et al. | 340/4.31 |
| 2012/0206375 | A1 | 8/2012 | Fyke et al. | 345/173 |
| 2013/0286553 | A1 * | 10/2013 | Vanska et al. | 361/679.01 |
| 2013/0335929 | A1 * | 12/2013 | Cavallaro | 361/749 |
| 2014/0003006 | A1 * | 1/2014 | Ahn | 361/749 |

FOREIGN PATENT DOCUMENTS

| | | |
|---|---|---|
| CN | 101430601 A | 5/2009 |
| EP | 1770965 A1 | 4/2007 |
| EP | 1830336 A1 | 9/2007 |
| EP | 2315186 A2 | 4/2011 |
| EP | 2508960 A2 | 10/2012 |
| JP | 2004046792 A | 2/2004 |
| JP | 2004192241 A | 7/2004 |
| KR | 2006-0134130 A | 12/2006 |
| KR | 20090006807 A | 1/2009 |
| KR | 2009-001161 A | 2/2009 |
| TW | 200404248 A | 3/2004 |
| WO | WO 00/60438 A | 10/2000 |
| WO | WO-2005/093548 A1 | 10/2005 |
| WO | WO 2009/050107 A2 | 4/2009 |
| WO | WO-2010/041227 A1 | 4/2010 |
| WO | WO 2011/117681 A1 | 9/2011 |
| WO | WO 2011117681 A1 | 9/2011 |
| WO | WO 2011/144972 A1 | 11/2011 |
| WO | WO-2013/160737 A1 | 10/2013 |

OTHER PUBLICATIONS

"How Users Manipulate Deformable Displays as Input Devices", Sang-Su Lee et al Apr. 10-15, 2010, (pp. 1647-1656).

"Gummi: A bendable computer", Dr Ivan Poupyrev—http://ivanpoupyrev.com/projects/gummi.php, (1994-2012), (7 pages).

"Murata Tactile controller TV remote hands-on (video)", Zach Honig—http://www.engadget.com2011/10/05/murata-tactile-controller-tv-remote-ands-on-vi . . . , (2012), (8 pages).

"Press release: revolutionary new paper computer shows flexible future for smartphones and tablets", http://www.hml.queensu.ca/paperphone, (2012), (2 pages).

Smith, Matt; *Nokia's kinetic future: flexible screens and a twisted interface*; Oct. 26, 2012; http://www.engadget.com/2011/10/26/nokias-kinetic-future-flexible-screens-and-a-twisted-interface/ (4 pages).

* cited by examiner

SIDE VIEW

LONGITUDINAL CROSS-SECTION

TRANSVERSE CROSS-SECTION

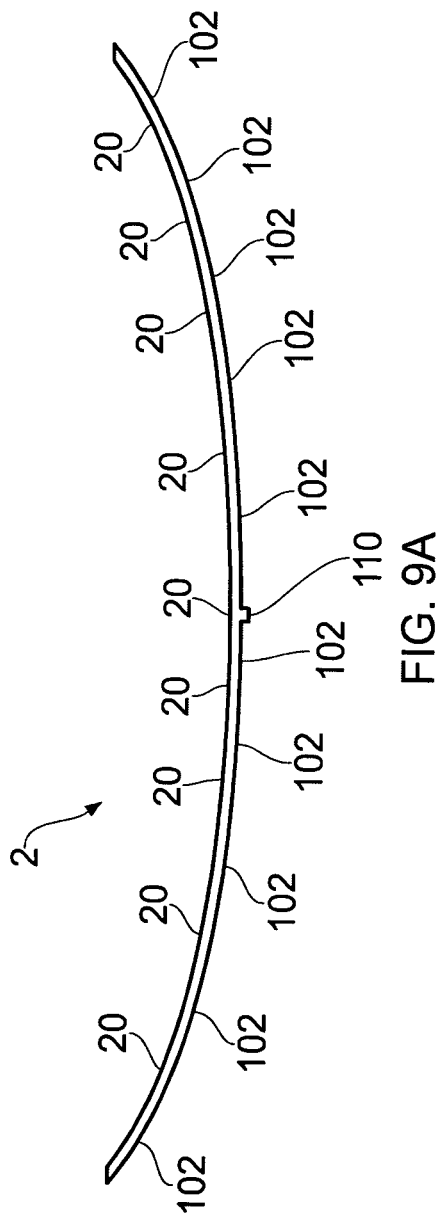
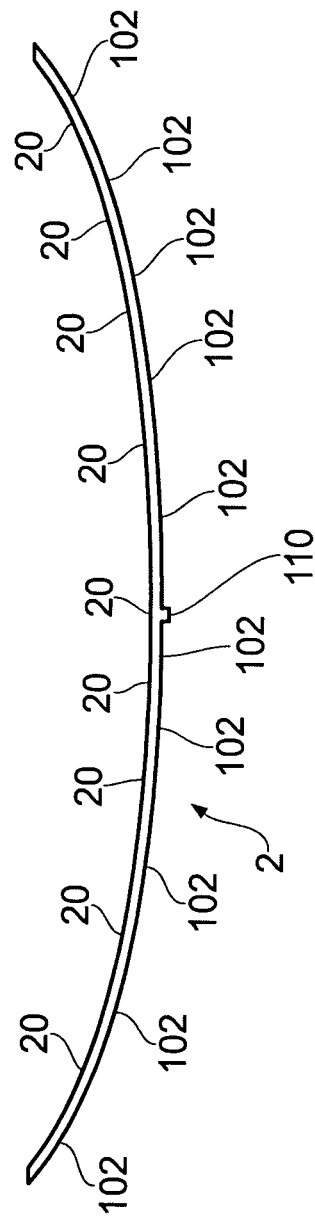
FIG. 9A
FIG. 9B

LIMITING MOVEMENT

TECHNOLOGICAL FIELD

Embodiments of the present invention relate to limiting movement, for example bending and/or twisting, of an apparatus.

BACKGROUND

It would be desirable to provide an apparatus that may be bent and/or twisted without being bent and/or twisted too much.

BRIEF SUMMARY

According to some but not necessarily all embodiments of the invention there is provided an apparatus comprising: a first portion comprising a projection extending in a first direction; a second portion comprising an aperture extending in the first direction, where the first portion and the second portion are configured for relative movement in at least the first direction; and wherein the projection extends from the first portion in the first direction between the first portion and the second portion through the aperture and wherein the aperture surrounds the projection with clearances configured to enforce limits on relative movement of the first portion and the second portion and configured to enable reciprocating movement of the first portion and the second portion in the first direction towards each other and away from each other.

According to some but not necessarily all embodiments of the invention there is provided an apparatus as claimed in any of claims 18 to 21, wherein the multiple portions comprise: a first terminal portion comprising a projection extending in a first direction from a first end; a second terminal portion comprising an aperture extending in a first direction at a second end; one or more intermediate portions each of which comprises a projection extending in a first direction from a first end and an aperture extending in the first direction at a second end, where the multiple portions are configured for relative movement in at least the first direction; and wherein each projection extends in the first direction through the aperture of an adjacent one of the multiple portions and wherein each aperture surrounds each projection with clearances configured to enforce limits on relative movement of the adjacent portions while enabling reciprocating movement of the adjacent portions in the first direction towards each other and away from each other.

BRIEF DESCRIPTION

For a better understanding of various examples of embodiments of the present invention reference will now be made by way of example only to the accompanying drawings in which:

FIGS. 9A and 9B illustrate the housing apparatus with different configurations of interconnects.

DETAILED DESCRIPTION

The description describes a number of examples of an apparatus 2. It should be understood that other examples of the apparatus 2 are possible while still falling within the scope of the claims.

The description describes a number of features or parts of an apparatus 2. It should be understood that other examples of the features and parts are possible while still falling within the scope of the claims. The description of a part or feature in relation to one example does not necessarily imply that that feature or part is essential to either that example or all examples. The description of a part or feature in relation to one example but not another example does not necessarily imply that that feature or part is unsuitable for use in that other example.

Figures 1A, 1B, 1C:
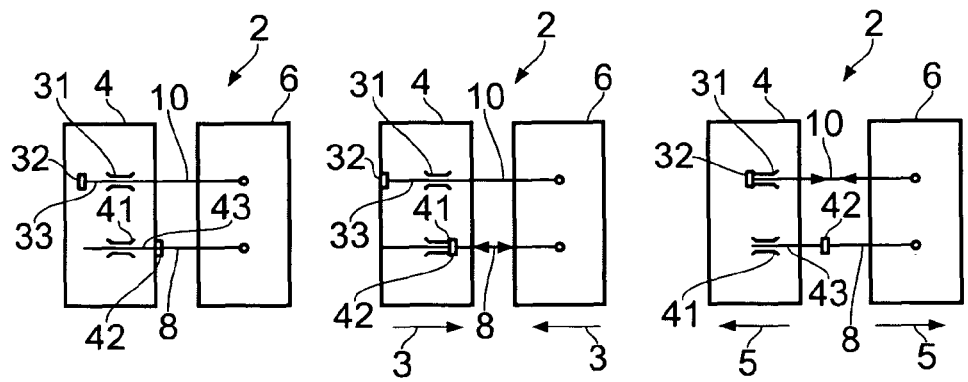
FIGS. 1A, 1B and 1C illustrate one example of an apparatus that comprises a first portion and a second portion connected via an interconnect.

FIGS. 1A, 1B and 1C illustrate one example of an apparatus 2 that comprises a first portion 4 and a second portion 6. The first portion 4 and the second portion 6 are configured for relative movement. The movement may be movement 3 towards each other as illustrated in FIG. 1B or movement 5 away from each other as illustrated in FIG. 1C.

An interconnect 20 interconnects the first portion 4 and the second portion 6. It is, in this example, configured both to enable reciprocal movement of the first portion 4 and the second portion 6 towards and away from each other and also to limit movement of the first portion 4 and the second portion 6 relative to each other.

The interconnect 20 may comprise a compression transmission arrangement 8. It is, in this example, configured both to enable movement of the first portion 4 and the second portion 6 towards each other and also to limit movement of the first portion 4 and the second portion 6 towards each other. The compression transmission arrangement 8 is configured to transmit compression forces between the first portion 4 and the second portion 6 to limit movement of the first portion 4 and the second portion 6 towards each other, such that they do not approach within a minimum value for a separation distance between the first portion 4 and the second portion 6.

The interconnect 20 may optionally comprise a tension transmission arrangement 10. It is, in this example, configured both to enable movement of the first portion 4 and the second portion 6 away from each other and also to limit movement of the first portion 4 and the second portion 6 away from each other. The tension transmission arrangement 10 is configured to transmit tension forces between the first portion 4 and the second portion 6 to limit movement of the first portion 4 and the second portion 6 away from each other, such that they do not separate by more than a maximum value for a separation distance between the first portion 4 and the second portion 6.

The compression transmission arrangement 8, in this example, is configured to transmit compression forces between the first portion 4 and the second portion 6 and, in this example, comprises a first compression abutment surface 42.

A first compression resisting surface 41 is, in this example, configured to transmit a force to the first portion 4. It may, for example be connected or coupled to the first portion 4. It may, for example, be fixed to the first portion 4 or an integral part of the first portion 4.

Relative spacing between the first compression resisting surface 41 and the first compression abutment surface 42, in this example, enables movement of the first portion 4 and the second portion 6 towards each other as is illustrated by the sequence of FIG. 1C, FIG. 1A, and FIG. 1B.

When the first portion 4 and the second portion 6 move towards each other in this example, a first gap 43 between the compression resisting surface 41 and the compression abutment surface 42 decreases in size.

The first portion 4 and the second portion 6 move towards each other in this example until abutment of the first compression resisting surface 41 and the first compression abutment surface 42 as illustrated in FIG. 1B. Abutment of the first compression resisting surface 41 and the first compression abutment surface 42 creates a compression force. The compression force transmitted through the compression transmission arrangement 8 resists further movement of the first portion 4 and the second portion 6 towards each other beyond a minimum separation distance. The compression transmission arrangement 8 therefore should be capable of transmitting a compressive force. It may therefore comprise a structure that is stiff and strong.

The tension transmission arrangement 10, if present, may be configured to transmit tension forces between the first portion 4 and the second portion 6. It comprises, in this example, a first tension abutment surface 32.

A first tension resisting surface 31 is configured, in this example, to transmit a force to the first portion 4. It may, for example be connected or coupled to first portion 4. It may, for example, be fixed to the first portion 4 or an integral part of the first portion 4.

Relative spacing between the first tension resisting surface 31 and the first tension abutment surface 32, in this example, enables movement of the first portion 4 and the second portion 6 away from each other as is illustrated by the sequence of FIG. 1B, FIG. 1A, and FIG. 1C.

When the first portion 4 and the second portion 6 move away from each other in this example a second gap 33 between the tension resisting surface 31 and the tension abutment surface 32 decreases in size.

The first portion 4 and the second portion 6 move away from each other in this example until abutment of the first tension resisting surface 31 and the first tension abutment surface 32 as illustrated in FIG. 1C. Abutment of the first tension resisting surface 31 and the first tension abutment surface 32 creates a tension force. The tension force transmitted through the tension transmission arrangement 10 resists further movement of the first portion 4 and the second portion 6 away from each other beyond a maximum separation distance. The tension transmission arrangement 10 therefore needs to be capable of transmitting a tension force. It may therefore comprise a structure that has good tensile strength.

Figure 2A:
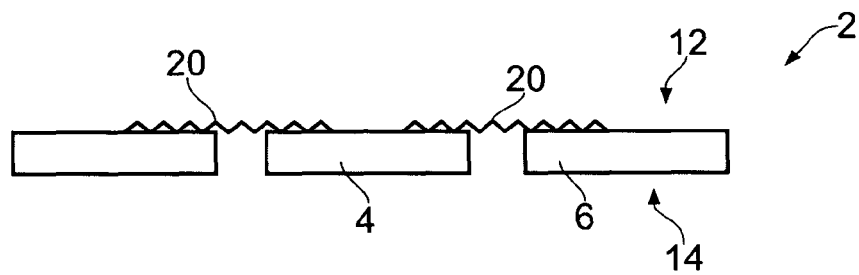
FIGS. 2A, 2B and 2C illustrate bending of the apparatus 2.
Figure 2B:
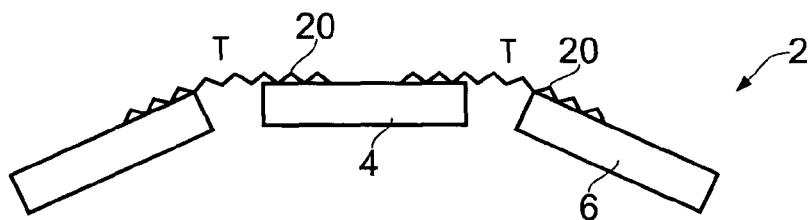
Figure 2C:
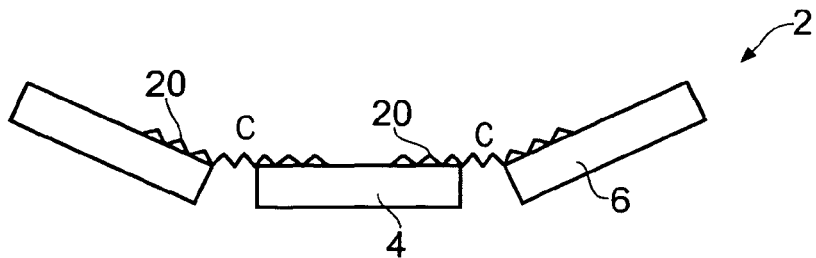

As illustrated in FIGS. 2A, 2B and 2C interconnects 20 interconnects adjacent portions of the apparatus 2. They are in this example located on the same side 12 of an equilibrium plane of the apparatus 2.

Straining of the apparatus 2 so that the side 12 is lengthened, as illustrated in the example of FIG. 2B, generates tension on the side 12 of the equilibrium plane. The straining may arise from bending and/or twisting the apparatus 2. The length is measured over the surface of the side 12. This surface is flat in FIG. 2A and arcuate (convex) in FIG. 2B. The interconnects 20 may be configured to limit the bending and/or twisting of the apparatus 2, for example, by providing a tension transmission arrangement 10

Straining of the apparatus 2 so that first side 12 is shortened, as illustrated in the example of FIG. 2C, generates compression on the first side of the equilibrium plane. The straining may arise from bending and/or twisting the apparatus 2. The length is measured over the surface of the side 12. This surface is flat in FIG. 2A and arcuate (concave) in FIG. 2C. The interconnects 20 may be configured to limit the bending and/or twisting of the apparatus 2, for example, by providing a compression transmission arrangement 10.

In this example, a dual-purpose interconnect 20 is positioned on one side 12 of the equilibrium plane and provides both a tension transmission arrangement 10 to limit convex bending, for example, and a compression transmission arrangement 8 to limit concave bending, for example.

In another example, a dual-purpose interconnect 20 may be positioned on the opposite side of the equilibrium plane to the preceding example and may provide both a tension transmission arrangement 10 to limit concave bending, for example, and a compression transmission arrangement 8 to limit convex bending, for example.

In still further embodiments, a single-purpose interconnect 20 may be positioned on one side of the equilibrium plane and may provide either one of the tension transmission arrangement 10 and the compression transmission arrangement 8 and another interconnect 20 may be positioned on the other side of the equilibrium plane and provide either one of the tension transmission arrangement 10 and the compression transmission arrangement 8.

In still further embodiments, one or more interconnects 20 may be positioned on one side of the equilibrium plane and may provide either (but not both) the tension transmission arrangement 10 or the compression transmission arrangement 8.

Figure 3A:
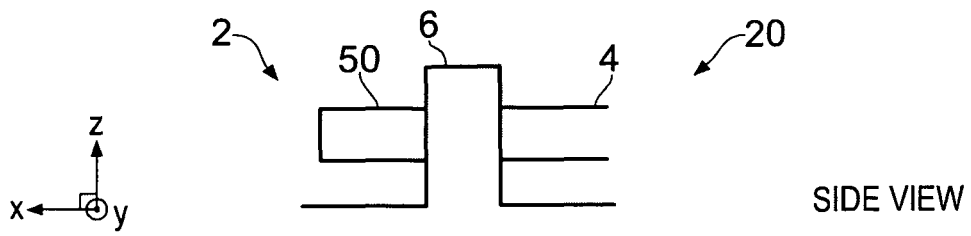
FIG. 3A illustrates an interconnect from a side view.
Figure 3B:
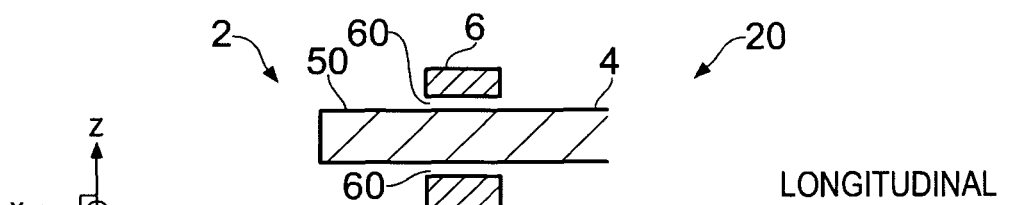
FIG. 3B illustrates an interconnect in longitudinal cross-section.
Figure 3C:
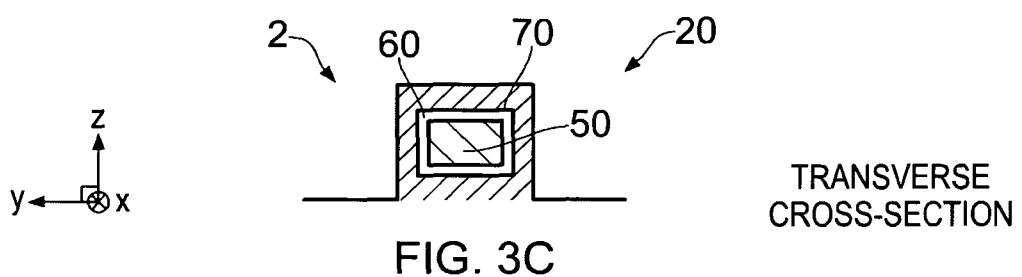
FIG. 3C illustrates an interconnect in transverse cross-section.

FIG. 3A illustrates an example interconnect 20 of the apparatus 2 from a side view. FIG. 3B illustrates the example interconnect 20 of the apparatus 2 in longitudinal cross-section. FIG. 3C illustrates the example interconnect 20 of the apparatus 2 in transverse cross-section.

An x-y-z Cartesian coordinate system is illustrated, where x, y and z represent mutually orthogonal directions. The x-direction defines a first direction. The y-direction and z-direction define transverse directions. The y-direction is a lateral transverse direction and the z-direction is a vertical transverse direction such that z=x×y.

The example interconnect 20 of the apparatus 2 comprises a first portion 4 comprising a projection 50 extending in a first direction (x-direction) and a second portion 6 comprising an aperture 60 extending in the first direction. The first portion 4 and the second portion 6 are both rigid.

The first portion 4 and the second portion 6 are configured for relative reciprocating movement in the first direction.

As illustrated most clearly in FIG. 3B, the projection 50 extends from the first portion 4 in the x-direction between the first portion 4 and the second portion through the aperture 60.

As illustrated most clearly in FIG. 3C, sidewalls of the aperture 60 surround the projection 50 with clearances 70. The clearances 70 are configured to enforce limits on relative movement of the first portion 4 and the second portion 6 while enabling reciprocating movement of the first portion 4 and the second portion 6 in the x-direction towards each other and away from each other.

Figure 3D:
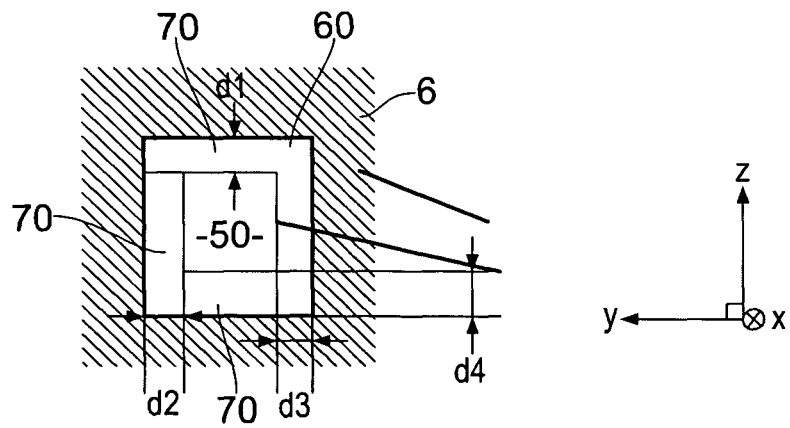
FIG. 3D illustrates in more detail the clearances shown in FIG. 3C.

FIG. 3D illustrates in more detail the clearances 70.

Transverse clearances d1, d2, d3, d4 between the projection 50 and the surrounding sidewalls of the aperture 60 in the second portion 6 are configured to enforce limits on relative transverse movement of the first portion 4 and the second portion 6 about the interconnect 20 defining those clearances 70. The clearances 70 enforce limits on movement of the first portion 4 and the second portion because they define how much the first portion (projection 50) can move relative to the second portion (sidewalls of the aperture 60) before the projection 50 and the sidewalls of the aperture 60 abut.

For example, the lateral clearances d2, d3 in the y-direction between the projection 50 and the surrounding sidewalls of the aperture 60 are configured to enforce limits on relative lateral movement (y-direction) of the first portion 4 and the second portion 6.

Figure 4A:
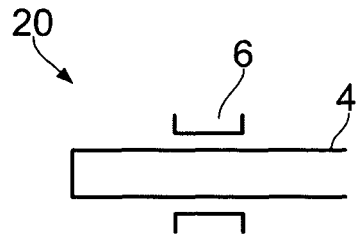
FIGS. 4A, 4B, 4C illustrate abutment of a projection and sidewalls of an aperture receiving the projection.
Figure 4B:
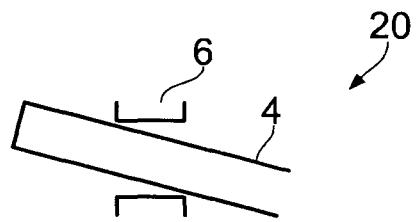
Figure 4C:
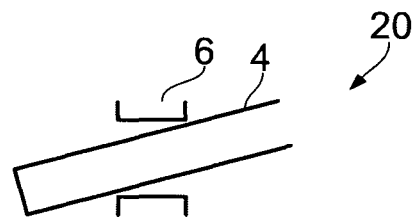

The lateral clearances d2, d3 also enforce limits on relative movement of the first portion 4 and the second portion 6 about a vertical transverse axis orthogonal to the x-direction and parallel to the z-direction. The lateral clearances d2, d3 may therefore limit yaw, for example, as illustrated in FIGS. 4A, 4B, 4C, by abutment of the projection 50 and the sidewalls of the aperture 60.

For example, the vertical clearances d1, d4 in the z-direction between the projection 50 and the surrounding sidewalls of the aperture 60 are configured to enforce limits on relative vertical movement (z-direction) of the first portion 4 and the second portion 6.

The vertical clearances d1, d4 also enforce limits on relative movement of the first portion 4 and the second portion 6 about a horizontal transverse axis orthogonal to the x-direction and parallel to the y-direction. The vertical clearances d1, d4 may therefore limit pitch, for example, as illustrated in FIGS. 4A, 4B, 4C, by abutment of the projection 50 and the aperture 60.

In this example, but not necessarily all examples, the transverse clearances d1, d2, d3, d4 between the projection 50 and the surrounding aperture 60 are configured to enforce limits on relative movement of the first portion 4 and the second portion 6 about a horizontal axis parallel to the x-direction. The transverse clearances d1, d2, d3, d4 may therefore limit roll as the projection 50 is not rotatable within the aperture 60 about an axis parallel to the x-direction.

The projection 50 may be considered to be a tenon in a mortice defined by the aperture 60. The aperture 60 extends fully through a part of the second portion 6.

The relative size and shape of the tenon compared to the mortice controls the clearances 70 and hence limits relative movement of the first portion 4 and the second portion 6. However, the tenon can reciprocate within the mortice enabling reciprocating movement of the first portion 4 and the second portion 6 in the x-direction.

The tenon may have a rectangular or square cross-section. The mortice may also have a rectangular or square cross-section.

The aspect ratio (ratio of width to height) of the cross-section of the tenon and the cross-section of the mortice may be the same.

In cross-section in a plane orthogonal to the x-direction, the tenon may have a bar shape in cross-section and the mortice may have a slot shape in cross-section as illustrated in FIG. 3C.

Figure 5A:
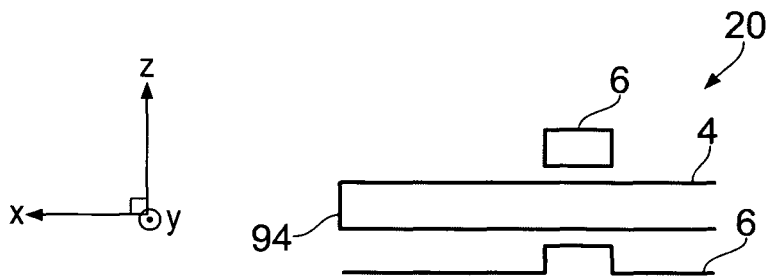
FIGS. 5A, 5B illustrate abutment of a projection of the first portion and the second portion.
Figure 5B:
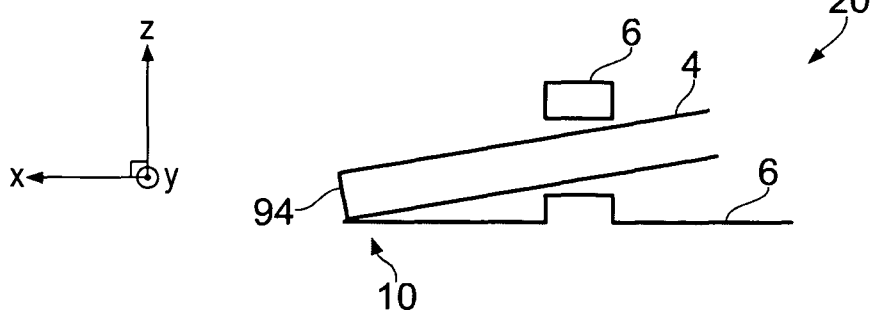

As illustrated in FIGS. 5A and 5B, a length of the projection 50 may enforce limits on relative movement of the first portion 4 and the second portion 6 about a horizontal transverse axis orthogonal to the x-direction and parallel to the y-direction. The length may therefore limit pitch, for example, as illustrated in FIGS. 5A, 5B by abutment of a terminal part 94 of the projection 50 and the second portion 6.

It will be appreciated from the foregoing that abutment may occur between the projection 50 of the first portion 4 and the second portion 6 when the first portion pitches or yaws relative to the second portion 6. This abutment may provide a tension transmission arrangement 10 as previously described.

Figure 6A:
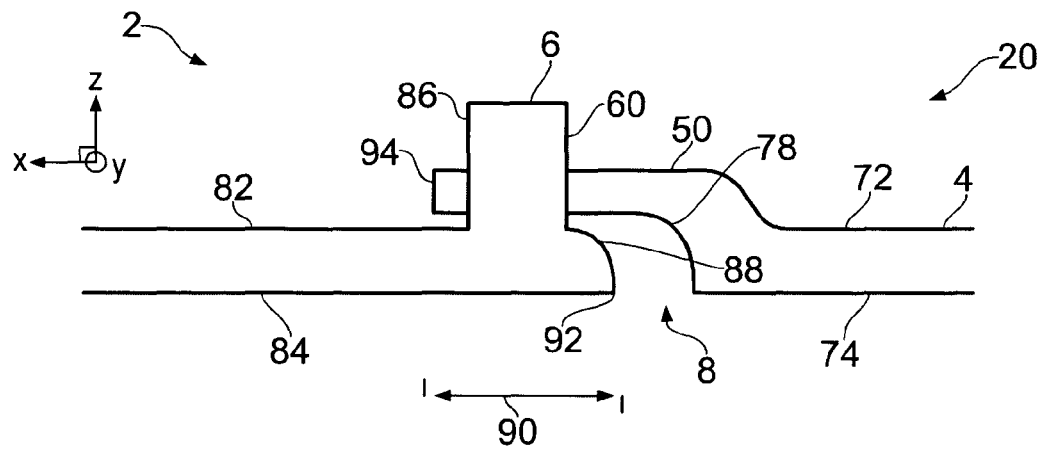
FIGS. 6A and 6B illustrate one of many possible implementations of an interconnect for the apparatus.
Figure 6B:
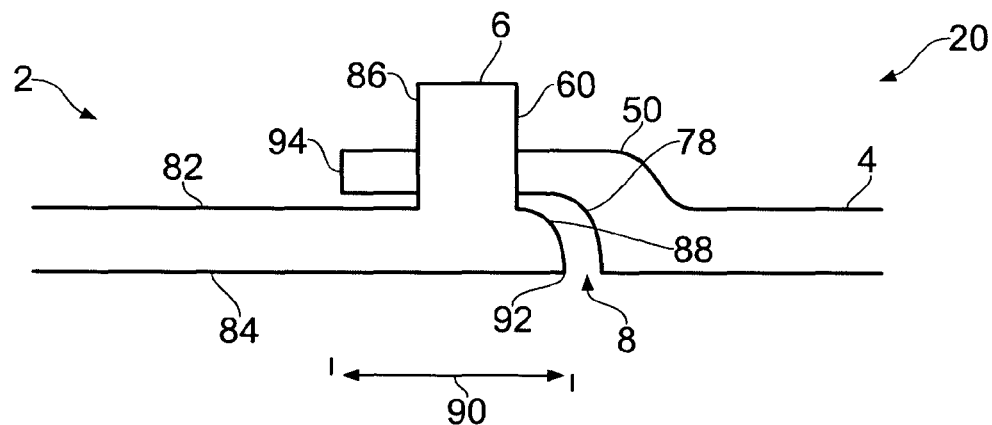

FIGS. 6A and 6B illustrate one of many possible implementations of an interconnect 20 for the apparatus 2. In this example, as previously described, the protection 50 of the first portion 4 passes through the aperture 60 in the second portion 6.

In this example, the projection 50 is positioned at an interior surface 72 of the first portion 4 and the aperture 60 is positioned at an interior surface 82 of the second portion 6.

When the projection 50 and the aperture 60 through which the projection 50 passes are aligned in the x-direction, an exterior surface 74 of the first portion 4 and an exterior surface 84 of the second portion 6 are aligned in the x-direction In the illustrated example, the exterior surface 74 of the first portion 4 and the exterior surface 84 of the second portion are aligned with the x-direction. A lug 86 extends in the z-direction upwards from the interior surface 82 of the second portion 6. The lug 86 has a through-hole in the x-direction that defines the aperture 60.

The projection 50 extends through the aperture 60 in the lug 86.

The projection 50 can reciprocate in the x-direction within the aperture 60.

This enables the first portion 4 to be moved away from the second portion 6 (FIG. 6A) and the first portion 4 to be moved towards the second portion 6 (FIG. 6B).

The exterior surface 74 of the first portion 4 and the projection 50 are connected via a surface portion 78 of the first portion 4.

The exterior surface 84 of the second portion 6 and the lug 86 defining the aperture 6 are connected via a surface portion 88 of the second portion 6.

The surface portion 78 of the first portion 4 and the surface portion 88 of the second portion 6 are configured to abut to limit movement of the first portion 4 and the second portion 6 towards each other.

This abutment provides a compression transmission arrangement 8 as previously described.

In the illustrated example, the surface portion 78 of the first portion 4 is concave and the surface portion 88 of the second portion 6 is convex to match the concave surface portion 78 of the first part.

The first portion 4 and the second portion 6 overlap at an area of overlap 90 which increases in size when the first portion 4 and the second portion 6 move towards each other in the x-direction (FIG. 6B) and which decreases in size when the first portion 4 and the second portion 6 move away from each other in the x-direction (FIG. 6A). The projection 50 extends through the aperture 60 in the area of overlap.

The second portion 6 comprises an exterior visible edge 92 that permanently overlaps the first portion 4 and defines an extremity of the area of overlap 90. The other extremity of the area of overlap may be defined by a terminal portion 94 of the projection 50.

Figure 7:
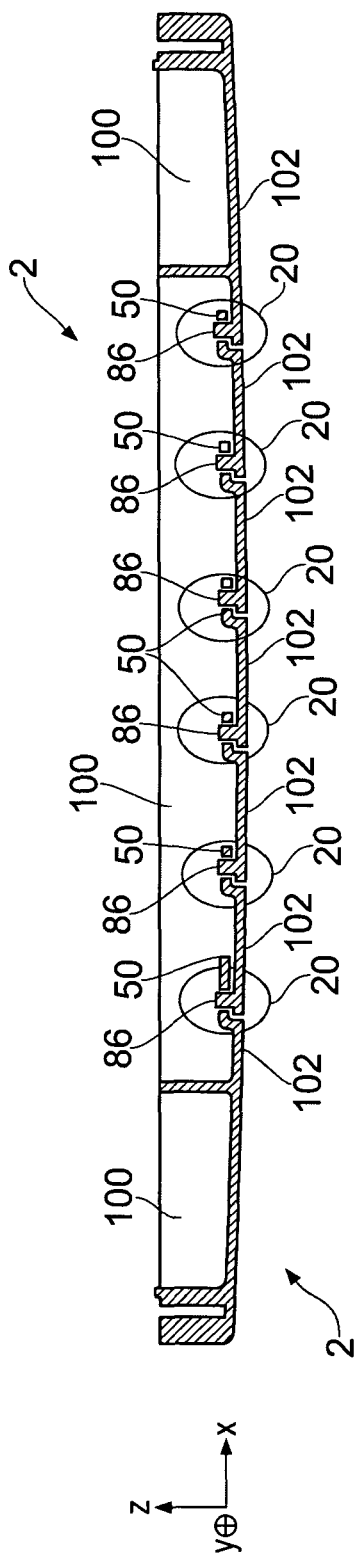
FIG. 7 illustrates a housing apparatus in longitudinal cross-section that comprises multiple portions 102 connected in series via interconnects.
Figure 8:
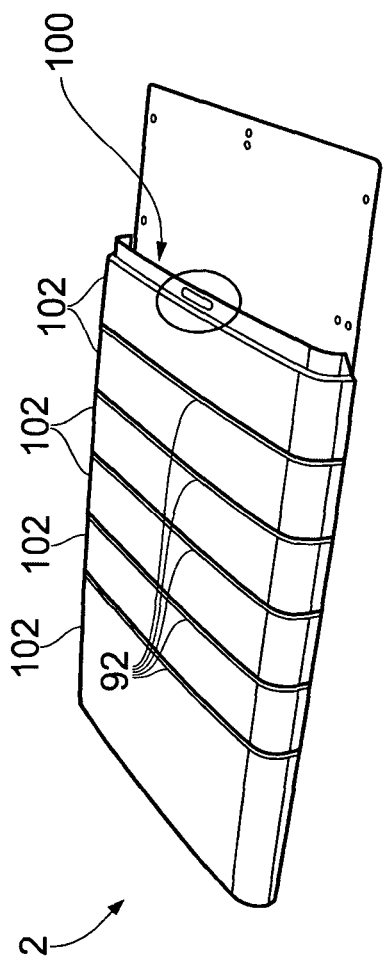
FIG. 8 illustrates the housing apparatus from a perspective view.

The interconnect 20 illustrated in FIGS. 6A and 6B may be used to provide a housing apparatus 2 as illustrated in FIGS. 7 and 8.

FIG. 7 illustrates the housing apparatus 2 in longitudinal cross-section. FIG. 8 illustrates the housing apparatus 2, from a perspective view.

The housing apparatus 2 may define one or more cavities 100 for receiving electronic components. The housing apparatus 2 may provide a shield for the electronic components.

The housing apparatus 2 may be formed from only rigid components.

The housing apparatus 2 may be an exterior housing that is used without an additional covering layer. In this example, the clearances 70 between the projections 50 and apertures 60 of the interconnects 20 may be filled with resiliently deformable, waterproof material such as an elastomer, for example, to provide weather-proofing of the housing apparatus 2.

As illustrated in FIG. 7, multiple portions 102 of the housing apparatus 2 are interconnected in series via interconnections 20. There is an interconnection 20 between adjacent portions of the multiple portions 102.

In the illustrated example, each of the multiple portions 102 and its adjacent portion 102 may function as the first portion 4 and the second portion 6 previously described.

Each interconnection 20 comprises a projection 50 extending through an aperture 60 that surrounds the projection 50 with clearances 70 configured to enforce limits on relative movement of the adjacent portions 102 while enabling reciprocating movement of the adjacent portions 102 in the x-direction.

In the illustrated example, the portion 102 that terminates the series of interconnected portions on the left of the figure, comprises a projection 50 extending in the x-direction from a rightmost end of that portion 102. Also, the portion 102 that terminates the series of interconnected portions on the right of the figure, comprises an aperture 60 extending in the x-direction at a leftmost end of that portion 102.

Portions 102 that are intermediate in the series of interconnected portions extend between the terminal portions.

Each of the intermediate portions 102 comprises a projection 50 extending in the x-direction from a rightmost end of the intermediate portion 102 and an aperture extending in the x-direction at the leftmost end of the same intermediate portion 102.

Each projection 50 in the series of interconnected portions 102 extends in the x-direction through the aperture 60 of an adjacent one of the multiple portions 102. Each aperture 60 surrounds that projection 50 with clearances 70 configured to enforce limits on relative movement of the adjacent portions 102 while enabling reciprocating movement of the adjacent portions 102 in the x-direction towards each other and away from each other.

FIGS. 9A and 9B illustrate in longitudinal cross-section an apparatus 2 that comprises a series of portions 102 that are connected in series via interconnects 20, similar to the apparatus 2 illustrated in FIGS. 7 and 8.

In FIG. 9B each of the interconnects 20 is the same. Each interconnect 20 has the same vertical clearances 70 between projection 50 and aperture 60. As the interconnects 20 are the same and evenly distributed, the apparatus 2 may be bent with a constant radius of curvature as illustrated in the Figure.

In FIG. 9A each of the interconnects 20 are not necessarily the same. The interconnects 20 towards the end of the series of interconnects 20 have greater vertical clearances 70 between projection 50 and aperture 60 than the interconnects 20 at the center of the series of interconnects 20. Consequently, the apparatus 2 may be bent with a radius of curvature that is greater towards the edges of the apparatus 2 than at the center of the apparatus 2 as illustrated in the Figure.

The radius of curvature may increase symmetrically towards the edges of the apparatus 2 with distance from a transverse center line 110. This may be achieved by making the vertical clearances 70 for interconnections 20 that are positioned equal distances from a transverse center line 110 the same and increasing the vertical clearances 70 with distance from the center line 110.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus, comprising multiple portions interconnected in series via interconnections between adjacent portions of the multiple portions, defining an aggregate length wherein each multiple portion comprises one each of a first portion and a second portion, wherein each interconnection comprises an axially extending and substantially linear projection extending through a corresponding aperture that surrounds the projection with clearances therebetween configured to enforce limits on relative rotational movement of the adjacent portions while enabling reciprocating movement axially between each substantially linear projection and the corresponding aperture of the adjacent portion while maintaining engagement there between, the limits of relative movement allowing the apparatus to bend over the aggregate length of the multiple portions due to the reciprocating relative movement between individual projections and their corresponding aperture.

2. An apparatus as claimed in claim 1, wherein the clearances for each interconnection is the same.

3. An apparatus as claimed in claim 1, wherein the clearances for at least some of the interconnections are different.

4. An apparatus as claimed in claim 3, wherein the clearances for
    interconnections that are positioned equal distances from a transverse center line are the same.

5. An apparatus as claimed in claim 1, wherein the multiple portions comprise:
    a first terminal portion comprising a projection extending in a first direction from a first end;
    a second terminal portion comprising an aperture extending in a first direction at a second end;
    one or more intermediate portions each of which comprises a projection extending in a first direction from a first end and an aperture extending in the first direction at a second end,
    where the multiple portions are configured for relative movement in at least the first direction;
    and wherein each projection extends in the first direction through the aperture of an adjacent one of the multiple portions and wherein each aperture surrounds each projection with clearances configured to enforce limits on relative movement of the adjacent portions while enabling reciprocating movement of the adjacent portions in the first direction towards each other and away from each other.

\* \* \* \* \*